June 12, 1962 C. R. BARNES ETAL 3,038,243

SILICON NITRIDE DIELECTRIC

Filed Aug. 31, 1959

2 Sheets-Sheet 1

INVENTORS
CHARLES R. BARNES
CHARLES R. GEESNER

BY Wade Koontz
Orlando Z. McCoy
ATTORNEYS

June 12, 1962 C. R. BARNES ETAL 3,038,243

SILICON NITRIDE DIELECTRIC

Filed Aug. 31, 1959

2 Sheets-Sheet 2

INVENTORS
CHARLES R. BARNES
CHARLES R. GEESNER
BY Wade Koontz and Orlando Z. McCoy
ATTORNEYS United States Patent Office 3,038,243
Patented June 12, 1962

3,038,243

SILICON NITRIDE DIELECTRIC

Charles R. Barnes, Medway, and Charles R. Geesner, Waynesville, Ohio, assignors to the United States of America as represented by the Secretary of the Air Force Filed Aug. 31, 1959, Ser. No. 837,306
2 Claims. (Cl. 29—25.42)
(Granted under Title 35, U.S. Code (1952), sec. 266)

The invention described herein may be manufactured and used by or for the United States Government for governmental purposes without payment to us of any royalty thereon.

This invention pertains to a method for making a capacitor or the like.

At the present time there is an increasing requirement in the military field for dielectric materials such as are employed in capacitors and the like to withstand environmental temperatures of the order of 500° C. and above. Ceramic and dielectric materials while capable of withstanding high temperatures unfortunately suffer a great increase in the dissipation factor at temperatures of the order of 500° C. This invention pertains to an improved dielectric material comprising the nonporous film of silicon nitride deposited on a metal substrate and forming the dielectric material in a capacitor or the like. The silicon nitride can also be employed as an encapsulating material to protect capacitor assemblies in accordance with the invention from oxidation at temperatures of 500° C. The invention relates to capacitors which employ silicon nitride as a dielectric and also to the method of forming nonporous silicon nitride films or coatings.

Briefly, a capacitor made in accordance with the invention, comprises a thin metal disc or wafer substrate that has deposited on one side thereof a coating of silicon nitride dielectric and a second capacitor plate deposited over the dielectric in the form of a thin conducting metal film. The capacitor leads are soldered to the metal substrate and to the conductive coating on the dielectric material. In order to prevent oxidation of the capacitor plates the capacitor may be completely inclosed within a silicon nitride encapsulation.

The capacitor in accordance with the invention is unique in that its electrical characteristics are satisfactory in high temperature environments as high as 600° C. The method of making a capacitor in accordance with the invention comprises placing a clean substrate disc of molybdenum or other suitable metal on a graphite core in a closed deposition chamber with the core surrounded by a heating coil supplied with radio frequency current to heat the core by induction or eddy current heating to thereby heat the substrate. The heating current is controlled thermostatically with the substrate at surface temperature of 960° C.+2°. While the substrate is at the controlled temperature, a mixture of clean and dry hydrogen and nitrogen gases and silicon bromide vapor is directed onto the surface of the substrate, chemical action causes the silicon bromide to decompose and the silicon to unite with the nitrogen to be deposited as a strongly adherent film of $Si_3N_4$ (silicon nitride) on the surface of the substrate. $SiBr_4$, $H_2$, $N_2$ are exhausted to hood.

The metal substrate disc is then removed from the deposition chamber and transferred to other apparatus including a deposition chamber in which a metal film is deposited on the substrate to form the second plate of the capacitor. In the case of gold, the gold may be plated by the well known vacuum evaporation process in which gold is evaporated in an evacuated chamber and plated from the vapor phase on the silicon nitride coating on the substrate. In other cases plating may be accomplished by chemical decomposition of metal chlorides or carbonyl chlorides in a manner hereinafter is completely described.

The capacitor thus formed may have gold or platinum wires suitably soldered by the use of gold or gold alloy or other high temperature solder to the plates of the condenser.

Where required the condenser assembly may be transferred to the original apparatus and completely coated on all sides with a thin film of silicon nitride so as to encapsulate the condenser assembly to prevent oxidation of the capacitor plates. More complete details of the invention in all its aspects will become more apparent by reference to the detailed description hereinafter given taken in conjunction with the disclosure in which.

Figure 1:
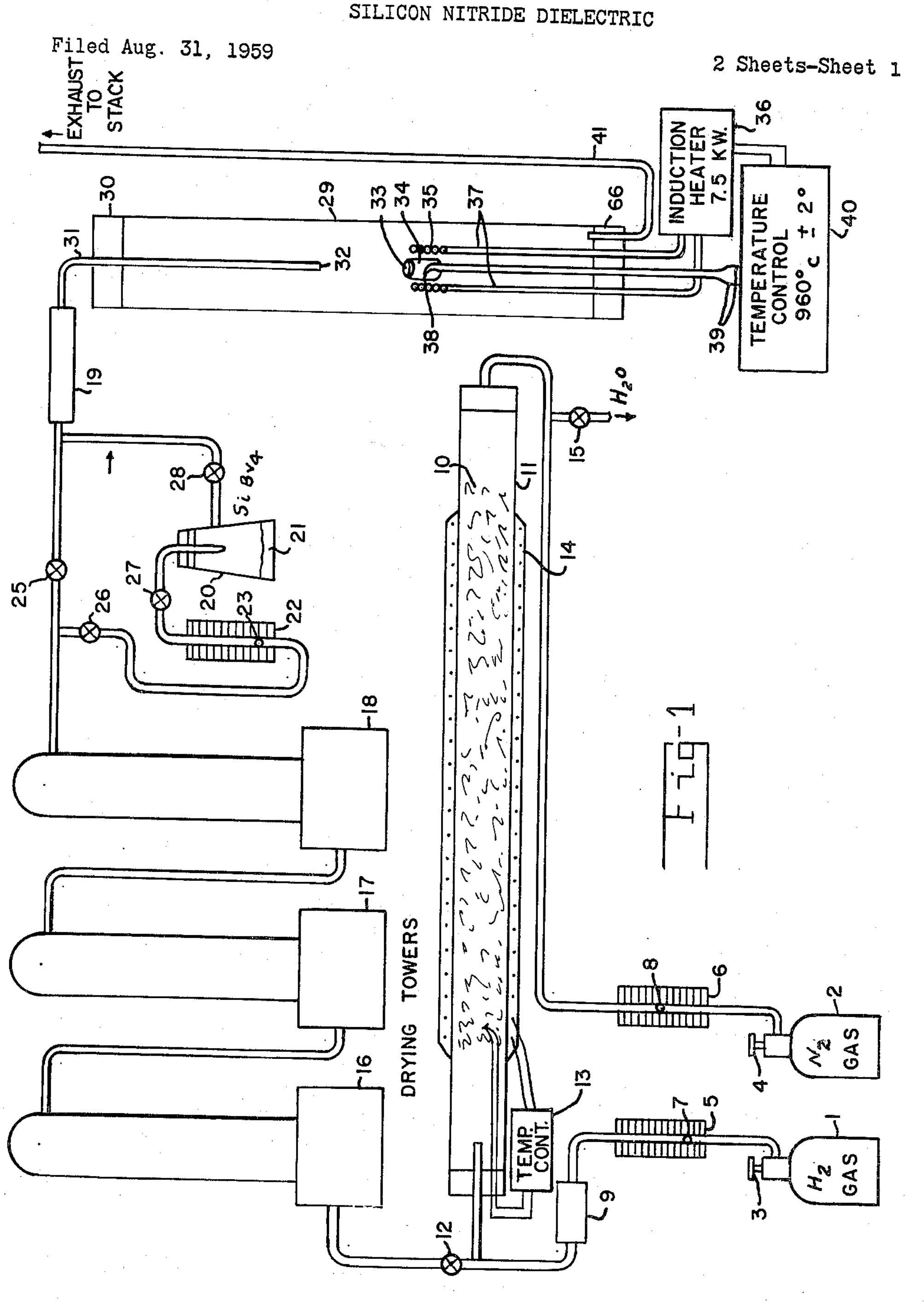
FIG. 1 is an apparatus diagram used in the description of the application of silicon nitride to a molybdenum substrate disc in the production of a capacitor that embodies the present invention.

The apparatus that is shown in FIG. 1 of the accompanying drawings consists of a bottle 1 of hydrogen gas and a bottle 2 of nitrogen gas that are released from the bottles by valves 3 and 4 at rates determined by flowmeters 5 and 6, respectively throughout. Illustrative gas flow rates are $H_2$ 300 ccs. per minute, and $N_2$ 1100 ccs. per minute. Illustrative flowmeters are glass tubes with upwardly expanding tapered bores containing observable floats 7 and 8. The floats 7 and 8 are displaced upwardly against gravity by the gas flow within the bore of increasing diameter along rate flow indicating scales, thereby indicating the rate of gas flow from the tanks 1 and 2, respectively throughout.

The hydrogen gas from the tank 1 is deoxidized in a deoxidizer 9 that catalytically removes any oxygen present. The $H_2$ gas illustratively is passed over the catalyst palladium on a dehydrated oxide taken from the group of oxides of aluminum and zirconium. The nitrogen gas from the tank 2 is passed through copper turnings 10 within a heated quartz tube 11. The two gases are then joined in a common gas conductor at the valve 12. A temperature controller 13 maintains the energization of an outwardly insulated Nichrome winding 14 around the quartz tube 11 at a predetermined value of 700° C. to 800° C. The copper turnings at this temperature combine with any oxygen in the nitrogen gas.

A water drainage valve 15 at a vapor discharge end of the tube 11 permits the drainage of water from the line after each plating run in reducing the copper oxide with hydrogen in the reactivation of the copper turnings. The water vapor produced is exhausted through the valve 15 to the atmosphere. Following the reduction of the copper the valve 15 is closed and the valve 12 is opened. The drying towers 16, 17 and 18 illustratively may contain calcium hydride of particle size range of preferably from −4 to +40 mesh per inch.

The line valve 25 controls the flow of gas past the silicon tetrabromide assembly. The gas flow is bypassed through the bottle 20 by the opening of the bypass valves 26, 27, and 28 and the partial closing of the line valve 25.

The bottle 20 contains silicon tetrabromide 21 in the liquid state. The mixed $H_2$ and $N_2$ carrier gas that enters the bottle 20 passes over the surface of the silicon tetrabromide and picks up its vapor.

The bypassed gas is measured by a flowmeter 22 wherein a float 23 in a tapered bore is supported against the pull of gravity. An illustrative flow rate of the bypassed gas is 100 ccs. per minute.

The silicon tetrabromide laden gas passes from the bottle 20 through the valve 28 and back into the gas line to the deposition chamber 29. The gas line between the silicon tetrabromdie bypass and the deposition chamber 29 may be joined by a rubber tube 19 that is preferred for the convenient interchange of deposition chamber equipment.

The deposition chamber 29 is closed at its upper end by a stopper 30 through which extends a gas and vapor feed pipe 31 and is closed at its lower end by a stopper 66. The pipe 31 extends axially of the deposition chamber 29 and terminates downwardly in a nozzle 32 that is spaced at illustratively 4¼ inches above a molybdenum disc 33 that serves as a substrate in the making of the capacitor in accordance with the invention.

Within the deposition chamber 29 the substrate 33 rests on top of a cylindrical core 34 of graphite or the like. A copper tubing watercooled coil 35 surrounds the graphite core 34 and heats the core by induction. Radio frequency induction heater 36 supplies electrical power to the coil 35 through the pair of leads 37. Both the coil 35 and the leads 37 are watercooled.

The deposition chamber temperature of the substrate 33 is maintained at a prescribed value by means of a thermocouple 38 contacting the core 34. The thermocouple 38 passes its output over the pair of leads 39 to a well known type of adjustable automatic temperature controller 40.

The temperature controller 40 is operatively connected to the radio frequency induction heater 36 so as to control the magnitude of the plate voltage supplied to the radio frequency oscillator and to thus control the oscillator output to regulate the temperature.

Gases introduced into the deposition chamber 29 through the pipe 31 pass from the deposition chamber to an exhaust stack 41 for their discharge into the atmosphere.

Figures 2, 3, 4, 5:
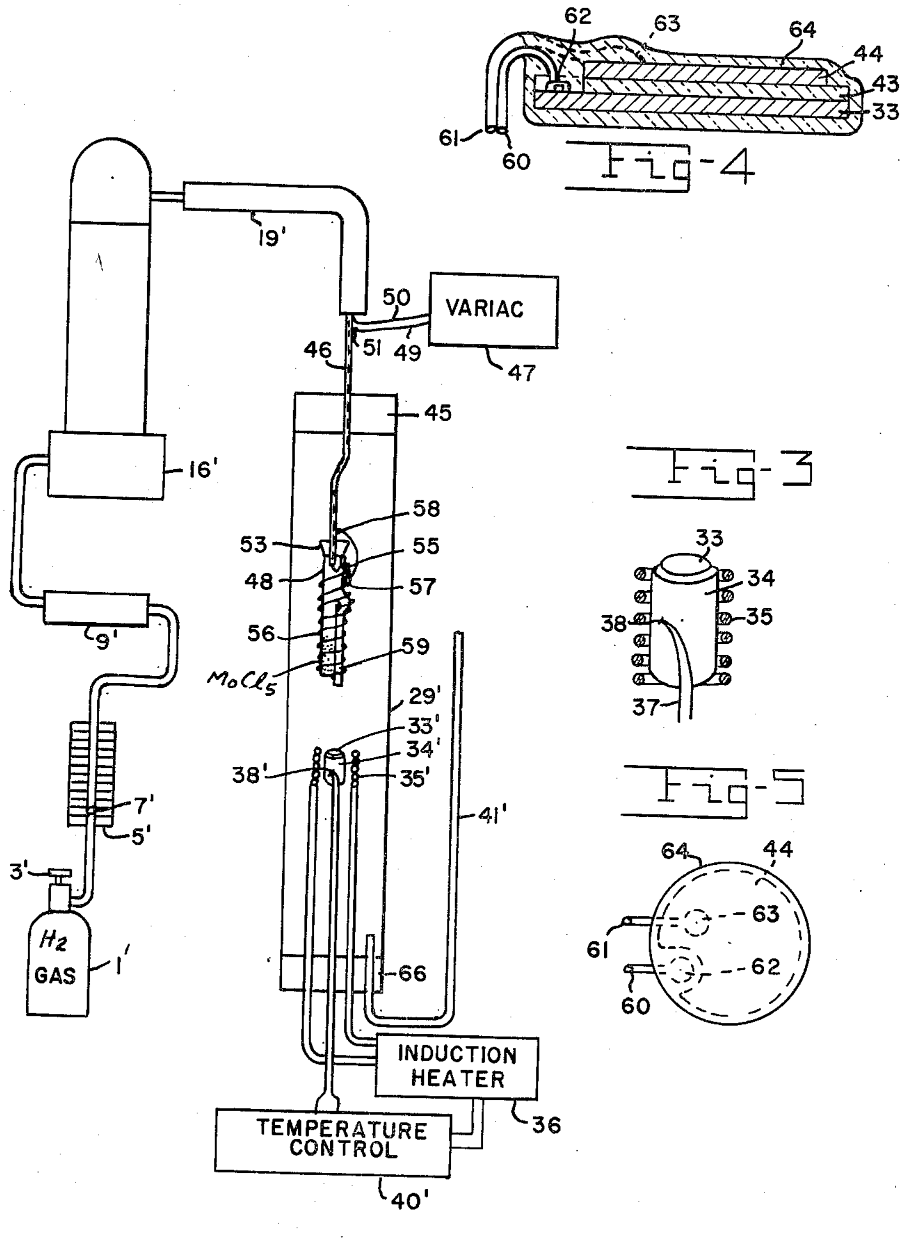
FIG. 2 is an apparatus diagram used in the description of the application of molybdenum on top of the silicon nitride coat applied to the molybdenum substrate disc by the use of the equipment in FIG. 1.
FIG. 3 is an enlarged perspective view of an inductively heated core used as a part of the furnace in both FIGS. 1 and 2.
FIG. 4 is an enlarged sectional view taken across a diameter of the capacitor that is produced by the use of the equipment in FIGS. 1 to 3 inclusive and using the process that is disclosed herein as a part of the invention.
FIG. 5 is a diminished plan view of the capacitor shown in section in FIG. 4.

The product from the use of the equipment shown in FIG. 1 is a molybdenum disc 33 with a coat of silicon nitride 43 on one face thereof, as indicated in FIG. 4.

An illustrative Mo substrate disc is 0.005 inch in thickness and 1 inch in diameter. At the start of the making of a capacitor the Mo disc 33 illustratively is cleaned in succession with acetone, a hot water solution of NaOH, hot chromic acid, distilled water and finally the disc is placed in the deposition chamber and is reduced with hydrogen at about 600° C.

The first stage product is made by placing a clean substrate molybdenum disc 33 on top of the graphite core 34 and setting the temperature control 40 for maintaining the surface of the disc at a temperature within the range of from 930° C. to 1030° C. This temperature range permits the pyrolytic deposition of silicon nitride on the upper surface of the substrate. The preferred temperature range for the deposition of optimum quality films of silicon nitride on the molybdenum discs is 960° C.±10°. The thickness of the deposition of silicon nitride 43 on the Mo disc maintained at this temperature and with a gas flow rate of 100 ccs. per minute as indicated by the meter 22, is about one-half mil thickness of silicon nitride per hour. This thickness is adequate for capacitor use.

The second stage in the production of the capacitor in accordance with the invention is by the use of the apparatus that is illustrated in FIG. 2 of the drawings. The components in FIG. 2 that correspond in structure and function to those in FIG. 1 bear corresponding reference numerals primed in FIG. 2.

The apparatus in FIG. 2 comprises a source of hydrogen gas, such as the $H_2$ tank 1′ from which the gas flow is regulated by operation of the valve 3′ as indicated by the position of the float 7′ along the flow rate indicating scale of the flowmeter 5′.

Hydrogen gas from the pressurized tank 1′ passes through the flowmeter 5′ and then any oxygen with it is removed by the deoxidizer 9′. The deoxidized gas passes to at least one drying tower 16′ that is filled with calcium hydride for the purpose of removing traces of moisture from the hydrogen. The ground glass couplings 19 and 19′ permit the interchange in the top of the deposition chamber 29 and 29′ of the stopper 30 carrying the pipe 31 in FIG. 1 with the stopper 45 carrying the brass tube 46 and the Pyrex molybdenum pentachloride evaporator 48 in FIG. 2. A variac or adjustable resistance 47 is removably connected to the brass tube 46.

The variac 47 is provided with two covered wires 49 and 50. The variac wire 49 is connected by solder 51 to the brass tube 46. The other variac wire 50 is threaded from the top down through the brass tube 46 prior to the insertion of the upper end of the brass tube into the lower end of the rubber tube 19′. The lower end of the brass tube 46 in the stopper 53 supports the $MoCl_5$ evaporator 48 within the deposition chamber 29′. The lower end of the wire 50 passes between the stopper 53 and the tube mouth of the Pyrex evaporator 48. The wire 50 is connected at a glass anchor 55 to a tube heating Nichrome winding 56 that extends around the tube. The opposite end of the winding 56 is anchored mechanically at a second tube glass anchor 57 from which it continues to its electrical connection at the soldered union 58 with the lower end of the brass tube 46.

The Pyrex molybdenum pentachloride evaporator 48 is charged with $MoCl_5$. The evaporator 48 has a side arm 59 that opens into the interior of the evaporator well above the top of the $MoCl_5$ and discharges $H_2$ carrying $MoCl_5$ vapor downwardly against the silicon nitride coat 43 on the molybdenum substrate 33′ resting on the top of the deposition chamber graphite core 34′. Exhaust stack 41′ exhausts gas and excess vapor from the deposition chamber 29′.

In the operation of the equipment that is illustrated in FIG. 2, the substrate 33′, that has one silicon nitride coat 43, shown in FIG. 4, adhered to one side of the substrate by the use of the equipment in FIG. 1, remains on the upper surface of the deposition chamber graphite core 34′. The deposition chamber stopper 30 and the tube 31 are removed from the deposition chamber 29 and are replaced by the stopper 45 with its connected variac 47 and molybdenum pentachloride evaporator 48.

The next step in the production of the capacitor that is contemplated hereby as applied to FIG. 2 is the adjusting of the valve 3′ for the flow of hydrogen from the tank 1′ at a preferred rate such as one liter per minute to purge cut the equipment. The variac 47 is adjusted to maintain the evaporator 48 at a preferred temperature of 194° C. The deposition chamber temperature control 40′ is adjusted to a preferred substrate surface temperature of 810° C. When the system has arrived at an equilibrium operating condition the hydrogen valve 3′ is maintained at a flow rate of one liter of hydrogen per minute.

The hydrogen gas then serves as a carrier gas in entering the molybdenum pentachloride evaporator 48, picking up molybdenum chloride vapor and discharging the gas mixture directly against the silicon nitride 43 which is on substrate 33 at the surface temperature of 810° C. as measured by an optical pyrometer. The gas exhaust stack 41′ relieves the pressure above ambient from inside the deposition chamber 29′. At this temperature molybdenum metal 44 is deposited on the surface of the silicon nitride 43, as indicated in the sectional view in FIG. 4. The plates 33 and 44 on opposite sides of the dielectric 43 then provide a capacitor.

A satisfactory useful capacitor comprises a molybdenum disc one inch in diameter and $5\times10^{-3}$ inch thick. It bears a silicon nitride film 43 that is $5\times10^{-4}$ inch thick and a molybdenum film 44 that is $5\times10^{-4}$ inch thick. Under the described conditions and a $H_2$ gas flow rate of one liter per minute and using the described equipment, the deposition of the Mo film $5\times10^{-4}$ inch thick requires about five minutes' time.

The shorting of the capacitor plates 33 and 44 which occurs during the deposition of the Mo film is removed by clamping a rubber stopper on top of the Mo film and etching back the thin Mo film 44 with dilute nitric acid for about 1/16 inch from the outer circumference of the capacitor radially to the edge of the stopper, to provide the capacitor structure indicated in section in FIG. 4.

Electrical lead attachment areas are then provided as indicated in FIGS. 4 and 5 of the drawings, by dissolving away a small spot of the thin Mo film with a drop of nitric acid. Beneath this first spot scratch away a smaller spot of $Si_3N_4$ film 43 over a sufficient area on the substrate 33 to attach an end of a first lead 60 to the substrate. The coated substrate is then returned to the deposition chamber. Platinum leads 60 and 61 then are each supported by a suitable length of glass tubing, not shown, a tapered end of which is imbedded in the stopper 66. The upper end of these glass tubes then will support the leads by inserting the leads in the open upper ends of the glass tubes. The unsupported ends of the leads are bent over to rest against the bare spot on the substrate and on the molybdenum film respectively. A bead of gold is placed adjacent to the tip of each wire. The stopper 30 and its pipe 31 are replaced to close the deposition chamber. The temperature control is adjusted to cause the gold to flux and form beads 62 and 63 at the tips of the wires 60 and 61 against the substrate 33 and the Mo layer 44, respectively throughout. This completes the construction of the capacitor which embodies this invention in its unencapsulated form.

The encapsulation of the capacitor is started by adjusting the temperature of the capacitor in the deposition chamber to within the range of from 960 to 1030° C. The capacitor with its leads 60 and 61 attached to the two capacitor plates is encapsulated within a skin coat 64 of $Si_3N_4$ using the equipment in FIG. 1 and the described process. The encapsulating $Si_3N_4$ is deposited to a desired thickness preferably on both sides of the capacitor. The capacitor is structurally and functionally complete for its use and operation up to about 600° C. The capacitor plates are protected from oxidation damage up to about 1000° C. when encapsulated with silicon nitride.

Commercial grades of hydrogen and nitrogen may be used with adequate purification facilities. The quartz tube 11 containing copper turnings 10 preferably is maintained at from 700 to 800° C. to form copper oxide of any oxygen in the gas passed through the tube. The copper turnings 10 are reactivated after each plating run by flushing hydrogen gas backwards through the quartz tube 11 and over the copper turnings 10, thereby removing the oxygen from the copper oxide as water vapor which is exhausted to the atmosphere by opening the valve 15, closing the valve 12 and using hydrogen from the tank 1. The valve 4 is opened sufficiently to provide a sufficient flow of nitrogen to prevent the entrance of water vapor into the $N_2$ gas line.

The process that is disclosed herein is believed to be the first to employ silicon nitride as a dielectric for capacitors. A high temperature capacitor is fabricated by the deposition of thin films of silicon nitride and of molybdenum by the disclosed thermo-chemical decomposition of chemical compounds from the vapor phase at hot substrate surfaces.

The process is applicable to not only capacitors but also to other electronic component parts that require a dielectric capable of functioning at 500° C. and above and that are used in electronic circuits of guided missiles, satellites, space vehicles and the like.

The chemical reactions that occur in the disclosed process of the thermo-chemical decomposition of metal compounds from their vapor phases include the deposition of silicon nitride dielectric as a film from silicon tetrabromide vapor that is reduced by hydrogen in the presence of nitrogen gas at the surface of a molybdenum disc, the temperature of which disc is about between 930° C. and 1030° C. at the surface where the silicon nitride is deposited, the silicon nitride reaction may be regarded as being $$SiBr_4+2H_2 \_\_ Si+4HBr$$
$$3Si+2N_2 \quad Si_3N_4$$

The gas mixture flow rate may be illustratively about 300 ccs. per minute $H_2$ with about 1100 ccs. per minute $N_2$. Theoretically other silicon halides should function interchangeably with silicon tetrabromide.

The deposition of molybdenum on top of the silicon nitride film may be regarded as being by the thermo-chemical reduction by hydrogen of molybdenum pentachloride vapor at a surface the temperature of which is about 810° C. The vaporization of molybdenum pentachloride is accomplished at 194° C. or above, depending on the desired rate of deposition. The $MoCl_5$ vapor so produced is carried by $H_2$ flowing at an illustrative rate of one liter per minute and flowed against the silicon nitride coat on the substrate maintained at a temperature of between 800 and 850° C. where a molybdenum film is deposited according to the reaction:

$$2MoCl_5+5H_2 \_\_ 2Mo+10HCl$$

The silicon nitride on molybdenum type of capacitor that is disclosed herein possesses physical characteristics which establish its superiority of performance over previously available capacitors. A capacitor that embodies the present invention when placed within a muffle furnace and heated stepwise from 25° C. to above 600° C. provides capacity and dissipation factors that are as follows:

| Temp. ° C. | Resistance, Megohms | Capacity, mmf. | Dissipation Factor | RC Product, Megohms Microfarads |
|---|---|---|---|---|
| 25 | $1.5\times10^{8}$ | 2,714 | <0.0001 | 407,000 |
| 100 | $8.5\times10^{7}$ | 2,719 | <0.0001 | 231,000 |
| 200 | $1.7\times10^{7}$ | 2,725 | <0.0001 | 46,300 |
| 300 | $1.7\times10^{6}$ | 2,737 | <0.0001 | 4,600 |
| 400 | $5.0\times10^{5}$ | 2,747 | 0.0003 | 1,375 |
| 500 | $3.2\times10^{5}$ | 2,757 | 0.0006 | 881 |
| 600 | $5.7\times10^{4}$ | 2,763 | 0.0033 | 157 |

Dielectric Strength — 1,000 volts/mil at 25° C.; 660 volts/mil at 500° C.

From the values that appear in the above chart it will be noted that the capacity and the dissipation factors increase from a capacity of 2714 mmf. at 1000 cycles per second and a dissipation below $1\times10^{-4}$ at 25° C. to a capacity of 2763 mmf. at 1000 cycles per second and a dissipation of $3.3\times10^{-3}$ at 600° C. The high temperature characteristics of a capacitor in accordance with the invention are believed to be unique.

It is within the scope of this invention that multiple alternated films of silicon nitride and molybdenum may be applied to a substrate.

In the miniaturization of electronic systems optimum space utilization may be accomplished by connecting two or more electronic components with wire that in and of itself is the capacitor that is required in that circuit. It is within the concept of this invention that an electrically conductive wire is coated with a dielectric film over which is bonded a film of another conductor with or without encapsulation. A wire of molybdenum coated with a film of $Si_3N_4$ over which is a conductive film such as the molybdenum film disclosed hereon then constitutes the capacitor plates with the silicon nitride film providing the dielectric therebetween. At opposite ends of the wire one capacitor plate connection is the wire itself and the other capacitor plate connection is soldered to the Mo film, as the wire 61 is soldered to the Mo film 44 in FIG. 4. This concept is of particular value in missiles, rockets, satellites and the like because of the space-weight conservation factor. It will be apparent that the metals and the compounds disclosed herein may be replaced by other similar materials without departing from this invention.

Although the preferred embodiment of the invention is the use of molybdenum as the metal substrate on which the film of silicon nitride is deposited, it should be understood that other metals such as platinum, stainless steel, gold, nickel, and nickel copper alloys such as monel metal are also suitable for use as a substrate forming one plate of the capacitor. In the deposition of a conducting layer on the layer of silicon nitride dielectric, while molybdenum is the preferred metal because of general availability and high temperature characteristics, other metal coatings can be used. For example, platinum may be plated onto the silicon nitride dielectric surface utilizing an arrangement in accordance with FIG. 2 of the drawings in which the platinum is plated out onto the heated surface of the dielectric coated substrate by mixing platinum carbonyl chloride with nitrogen as a carrier to decompose on the surface of the substrate as metallic platinum.

Similarly, nickel can be plated on the substrate by the decomposition of nickel carbonyl. Gold preferably would be applied by the well known cathodic sputtering process or by the evaporation of molten gold in a vacuum. The metal chromium is also satisfactory as a plate material and can be plated by the decomposition of chromium hexa carbonyl.

It is noted that the various carbonyl compounds listed above will decompose on the heated surface of the substrate in the temperature range of from 100 to 300° C. to leave a metallic plated film. Since the carbonyl compounds are easily volatilized they may be introduced as a vapor into the apparatus disclosed in FIG. 2 and the plating process carried out until the plating has built up to a desired thickness, for example, ½ to 1 mil thick. Where platinum is used as a substrate and the metal plating on the silicon nitride coating is also platinum it is not necessary to encapsulate a capacitor so constructed because of the high resistance of platinum to oxidation. Where substrates of metals other than molybdenum are employed a suitable high temperature solder such as gold or gold alloys should be employed for soldering the leads to the condenser plates it being necessary however that the solder employed should have a melting point considerably above 625° C.

While the substrate has herein been primarily disclosed as being a flat disc it is conceivable the substrate can be in the form of a metal rod or tube of a suitable high temperature resistant metal of the type above outlined so that the resultant capacitor will be of cylindrical shape.

Further, it is noted that the process of depositing a thin protective film of silicon nitride described above for encapsulating a capacitor can be employed as a protective coating on other apparatus made of metal wherein it is desired to protect the metal against oxidation when placed in environments where the temperatures may rise to the order of 500 to 600° C.

Having now described our invention we claim:

1. The method for producing a capacitor operable at temperatures over a range up to and including 500° C. with a substantially flat dissipation factor over the range and consisting of capacitor plates of molybdenum with a film of silicon nitride positioned between the capacitor plates and serving as the dielectric therebetween, by cleaning a surface area on a molybdenum substrate using as the cleansing agent a selection from the group that consists of acetone, a hot water solution of sodium hydroxide, hot chromic acid, distilled water and hydrogen gas at about 600° C.; mixing dry and clean hydrogen gas with nitrogen gas, passing the mixed hydrogen and nitrogen gases over silicon tetrabromide for the purpose of providing a gas and vapor mixture of hydrogen and nitrogen with silicon tetrabromide vapor, contacting the molybdenum substrate clean surface at the temperature of about 930° C. to 1030° C. with the hydrogen and nitrogen gas mixture as carrier with silicon tetrabromide vapor for the purpose of bonding silicon nitride to the surface of the molybdenum substrate as a film having dielectric properties, passing hydrogen gas into a molybdenum pentachloride evaporator at a temperature of about 194° C. for mixing the hydrogen gas as carrier with molybdenum pentachloride vapor, flowing the hydrogen gas carried molybdenum pentachloride vapor against the silicon nitride on the molybdenum substrate at a temperature of about 810° C. for the purpose of applying a film of molybdenum on top of the silicon nitride on the molybdenum substrate, applying dilute nitric acid to the edges of the films of silicon nitride and molybdenum for spacing the film edges uniformly inwardly from the edge of the molybdenum substrate, removing an attaching area of the films of silicon nitride and molybdenum from the surface of the molybdenum substrate, gold soldering one end of a first wire to the surface of the molybdenum substrate, and gold soldering one end of a second wire to the surface of the molybdenum film that is separated by the dielectric silicon nitride film from the molybdenum substrate.

2. The method defined in the above claim 1 followed by the step of mixing hydrogen and nitrogen gases, passing the mixed hydrogen and nitrogen gases over the surface of liquid silicon tetrabromide for the purpose of carrying silicon tetrabromide vapor therefrom and flowing the silicon tetrabromide vapor carried by the hydrogen and nitrogen gases against the capacitor made by the method defined in the above claim 1 in encapsulating the capacitor in a covering of silicon nitride of dielectric properties.

References Cited in the file of this patent

UNITED STATES PATENTS

| | | |
|---|---|---|
| 2,398,176 | Deyrup | Apr. 9, 1946 |
| 2,758,267 | Short | Aug. 7, 1956 |
| 2,759,854 | Kilby | Aug. 21, 1956 |
| 2,838,723 | Crownover et al. | June 10, 1958 |
| 2,871,428 | Shen | Jan. 27, 1959 |
| 2,871,545 | Weldon | Feb. 3, 1959 |
| 2,882,586 | Shen | Apr. 21, 1959 |
| 2,930,951 | Burger et al. | Mar. 29, 1960 |

OTHER REFERENCES

Publication, Vapor-Plating, by Powell, Campbell, Gonyer Lib. No. TS 695B3, pages 95 to 101 and 120, 121.